United States Patent [19]

Bladh

[11] 4,344,976
[45] Aug. 17, 1982

[54] PROCESS FOR RECOVERING MEAL AND OIL FROM RAW FISH

[75] Inventor: Per Bladh, Jarna, Sweden

[73] Assignee: Alfa-Laval AB, Tumba, Sweden

[21] Appl. No.: 210,849

[22] Filed: Nov. 26, 1980

[30] Foreign Application Priority Data

Nov. 30, 1979 [SE] Sweden .............................. 7909929

[51] Int. Cl.³ ......................... A23L 1/31; A23L 1/325
[52] U.S. Cl. .................................. 426/472; 159/28 D; 426/417; 426/478; 426/643
[58] Field of Search .............. 426/478, 480, 417, 643, 426/465, 472, 473, 520; 159/28 D, 11 A, 13 A; 34/141, 142; 366/309, 149; 165/94

[56] References Cited

U.S. PATENT DOCUMENTS

| 1,370,049 | 3/1921 | Satow | 426/473 |
| 4,212,889 | 7/1980 | Fuentevilla | 426/643 |
| 4,216,239 | 8/1980 | Gloppestad | 426/472 |

Primary Examiner—Raymond N. Jones
Assistant Examiner—George C. Yeung
Attorney, Agent, or Firm—Cyrus S. Hapgood

[57] ABSTRACT

The invention relates to a process for recovery of meal of high protein quality and oil from fish. To obtain a high protein quality in fish meal, one or both of the conditions of short process time and low temperature are essential factors. In the process according to the invention, the heating of the fish mass is carried out in any conventional way, and oil is separated from the heated fish mass by means of a centrifuge provided with a separate outlet for separated oil phase. The new and characterizing feature of the invention is that the stick water and sludge discharged from the centrifuge are fed together to an evaporation unit where the mixture of sludge and stick water is fed through one or several indirectly heated tubes, the internal walls of which are continuously cleaned by means of a scraping device and the outlet of which is connected to a separation space for steam and evaporated product. Finally, the evaporated product is dried in any known way.

11 Claims, 1 Drawing Figure

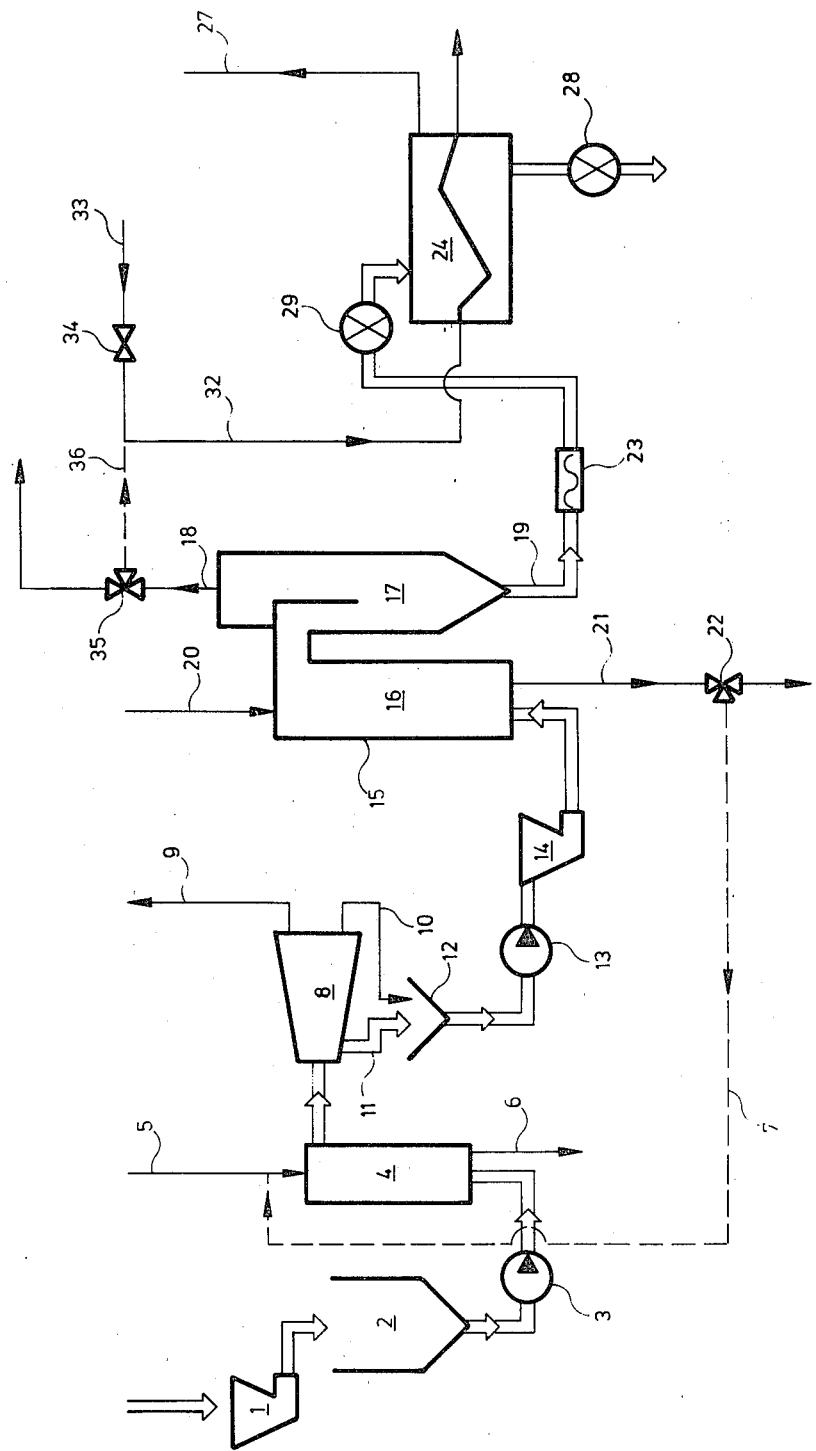

PROCESS FOR RECOVERING MEAL AND OIL FROM RAW FISH

The present invention relates to a process for the recovery of fish meal and fish oil from raw fish. Particularly, the invention concerns the production of fish meal of high protein quality for animal feeding.

From various tests for the purpose of producing fish meal products of high nitritional value, it is known that in the variouus heat treatments at raised temperature, to separate oil and evaporate the relatively large amount of water contained in the raw material, have a detrimental influence on the quality or the nutritional value of the fish proteins. The time factor is certainly also important, and therefore at least one of the conditions of short process time and low process temperature is important for maintaining the functional characteristics of the fish proteins.

With the knowledge that a process temperature not exceeding 50°-60° C. has no substantial detrimental influence on the nutritional value of the fish proteins, a conventional fish meal plant could be directly modified by arranging to carry out all the heating steps under vacuum. Such a process, however, would probably be unsatisfactory due to unreasonably long residence time in the different process steps and due to separation difficulties and clogging problems that would arise.

The principal object of the present invention is to provide a process for the recovery of fish meal with higgh protein quality, which process makes possible the use of sufficiently mild process conditions as to time and temperature to avoid said separation and clogging problems and which process does not require unacceptable increases in capital costs and operating costs.

A process according to the present invention comprises heating a fish mass obtained by disintegrating raw fish, separating and removing oil from the heated fish mass by means of a centrifuge provided with a separate outlet for a separated oil phase, and evaporating and drying sludge and stick water discharged from the centrifuge to a fish meal with desired low water content. The process is characterized mainly in that the stick water and sludge discharged from the centrifuge, possibly after having been subjected to a disintegration treatment, are fed together to an evaporation unit where the mixture of sludge and stick water are fed essentially in plug-flow through at least one indirectly heated tubee, the inner walls of which are continuously cleaned by means of a scraping device, whereafter the evaporated product is separated from the steam formed in said tube and dried in a drying step.

The basic idea of the present invention is that a larger water amount than in a conventional fish meal process is removed in a step where the stick water and sludge from the oil separation step are evaporated together in an evaporator through which the fish mass is passed in a so-called plug-flow during very short residence times, that is, in the range of 2-6 minutes. According to one embodiment of the invention, a great part of the evaporation is carried out at atmospheric pressure and at comparatively high temperature, that, is, a product temperature of 80°-90° C. This provides an advantageous heat economy, while the fish mass stays in the evaporator such a short time that the detrimental influence on the fish proteins caused by said high temperature is very limited.

The evaporation step according to the present invention also provides other differences and advanages compared with convention processes. For example, the stick water evaportion heretofore carried out separately was a critical step. If the stick water fed to the evaporator contained a large quantity of fine particles ("fines") due to deficient separation in the preceding centrifugation step, or the raw fish was excessively disintegrated, clogging of the evaporation plant and costly stoppages easily occured. This problem is practically eliminated in the present process, in which the evaporation is carried out by means of tubular heat exchangers provided with rotating scraping means. Evaporators of this kind not only allow large amounts of solid material to pass through the tubes without risk of clogging but also they can even evaporate the fish mass up to a high dry content in the range of 60-80%. Further, the disintegration of the raw fish can be carried out to a considerably greater degree than before, since there are no demands for separation of solid particles from stick water in the oil separation centrifuge because the conventional stick water evaporator and thus the incrusting problem in the same are eliminated.

The initial heating step can be carried out in any way. The temperature should, however, not exceed 55°-60° C., particularly if a boiling apparatus is used that requires comparatively long residence time for the fish mass. For the process of the present invention, preferably a heat exchanger is used which is of the same type as the one used in the evaporation plant, that is, a heat exchanger in which the fish mass is fed through an indirectly heated tube provided with rotating scrapers which keep the inner walls of the tube clean from incrustations and cause turbulence. In this way, the heating time can be kept very short, for example, in the range of 0.5-3 minutes. Condensed steam from the evaporation can be used as heating medium in the initial heating step.

If the heat exchanger with rotating scraping means and said short residence timme ae used for heating the raw fish mass, a higher temperature (for example, in the range of 70°-90° C.) can be used also in this step without any severe detrimental influence on the fish proteins. Such a heating of the fish mass for a short time provides pasteurization. This is a further advantage of the process according to the inventio, since this pasteurization is obtained for nothing compared with a vacuum process of a conventional type, in which the pasteurization step would require additional equipment. If in the process of the invention heating of the fish mass to a temperature in the range of 70°-90° C. is desired only in order to obtain said pasteurization effect, said heating can be effected either in the raw fish heater or in thee evaporator. The first alternative is advantageous with respect to the short residence time. On the other hand, the advantageous heat economy by using higher temperature in the evaporator has already been mentioned.

The final step of drying can be carried out in any way. By evaporating the fish mass according to the invention to a very high dry content in the range of 50-80%, a considerably abbreviated drying procedure is obtained. This means an improvement of the protein quality even if a conventional drying method at a temperature in the range of 80°-100° C. is used. In the preferred process according to the invention, however, a milder drying method is used such as vacuum drying or spray drying. If the drying is carried out under vacuum and the evaporation occurs at atmospheric pressure, the steam produced in the evaporator can be used as heating medium in the drying step.

Due to the fact that the amount of water to be removed in the final drying step is less than heretofore, even such a method as freeze-drying can be economically possible in this context, particlarly if a product of very quality is desired.

Even if the evaporation in the new process is carried out for economic reasons at atmosphere pressurre and at "normal" process temperature, the process. In such a case also the evaporation step is carried out under vacuum, which makes the process more expensive. This additional cost, however, can be more than compensated by a high product quality in a process taking full advantage of low temperature steps as well as short residence times.

For the oil separation a centrifuge is used in which the separated oil phase is directly remmoved through a separate outlet for storing of further finishing. For this purpose, a so-called three-phase decanter is suitable, that is, a centrifuge provided with a horizontally journalled conveyor screw for separated sludge and three separate outlets for separated oil phase, stick water phase and sludge phase. According to the invention, the separated stick water phase and sludge phase are directly remixed. Before the suspension is fed to the evaporation plant, a further fine division of the particles by means of a disintegrating device can be advantageous. Since in this case the separation of sludge phase from stick water phase is not required, it is also possible to use a modified centrifuge in which the oil phase is taken out separately while the stick water and the sludge are discharged through a common outlet.

The invention will be further described below by means of an embodiment shown as an example in the attached drawing, in which the single illustration is a flow diagram of a continuous fish process according to the invention.

Raw fish is finely divided in a disintegrator 1 and fed to a buffer tank 2. From the tank 2 the fish mass is fed by means of pump 3 through a heat exchanger 4 in which the fish mass is fed in plug-flow through an indirectly heated vertical tube provided with a rotating scraping device. Lines 5 and 6 are a supply line and a discharge line, respectively, for the heating medium. The broken line 7 designates an optional supply line in which the heating medium is condensate from the subsequent evaporation step. The fish mass leaving the heat exchanger 4 is fed to a three-phase decanter 8, from which there is continuouslyy discharged separated oil phase through line 9, the stick water phase through line 10 and a sludge phase through 11. The sludge phase and stick water phase are then remixed in a collection space 12, from which the remixed fish suspension is fed by means of a pump 13 through a further disintegrator 14 and introduced into the bottom of the evaporating plant 15.

The evaporating plant 15 comprises a vertical heat exchanger tube 16. The latter is provided internally with rotating scrapers and a separating space 17 for the separation of evaporated product which is discharged at the bottom through line 19 and which is discharged at the top through line 18. The heating steam is supplied to the evaporator through line 20 and the corresponding condensate is discharged at the bottom of the plant through line 21. The three-way-valve 22 and the line 7 designate, as mentioned above, the option of using the condensate as heating medium in the heat exchanger 4.

From the evaporation plant, the fish mass is fed through line 19 and a conveyor 23 to a dryer 24, which is connected to a vaccum pump through line 27. Fish meal dried to a dry content in the range of 50–80% is discharged through a lock 28. Heating medium for the dryer is supplied through line 32. Heating gas or steam is supplied through line 33 and the valve 34. The dotted line 36 and the three-way-valve 35 designate the option of using the steam produced in the evaporator 15 also as the heating medium for the dryer.

When the drying step is carried out under vacuum, the temperature of the fish mass during the drying step should not be substantially greater-than 60° C.

I claim:

1. In the recovery of meal of high protein quality and oil from fish, the process which comprises heating a fish mass obtained by disintegrating raw fish, separating and removing oil from the heated fish mass by subjecting said mass to a centrifuging operation and separately discharging a separated oil phase from said operation, discharging stick water and sludge from the centrifuging operation, feeding a mixture of the stick watr and sludge to an evaporating zone and there passing the mixture in plug-flow through indirectly heated tube means while continuously cleaning the inner walls of said tube means by scraping said inner walls, thereby obtaining an evaporated product and steam in said tube means, separating said evaporated sludge-containing product from said steam, and drying said evaporated product.

2. A process according to claim 1, in which the fish mass in said evaporating zone is evaporated to a dry substance content of 50–80% by weight.

3. A process according to claim 1, in which the residence time for the fish mass in the evaporating zone is in the range of 2–6 minutes.

4. A process according to claim 1, in which the raw fish mass is heated by passing it in plug-flow through indirectly heated tube means while continuously cleaning the internal walls of the tube means by scraping said walls.

5. A process according to claim 4, in which the residence time for the fish mass in said tube means is in the range of 0.5–3 minutes.

6. A process according to claim 1, in which said centrifuging operation is carried out in a centrifuge of the kind provided with a rotating feed screw and three separate outlets for separated oil phase, stick water phase and sludge phase, respectively, the sludge phase and the stick water phase discharged from the centrifuge being mixed before entering the evaporation zone.

7. A process according to claim 1, in which the drying step is carried out under vacuum and the temperature of the fish mass during the drying step does not substantially exceed 60° C.

8. A process according to claim 1, in which the evaporation in said zone is effected at about atmospheric pressure by means of indirect steam as heating medium, the process comprising also using condensate from the evaporation step for heating the raw fish mass.

9. A process according to claim 1, in which the evaporation in said zone is effected at about atmospheric pressure by means of indirect steam as heating medium, the process comprising also using the steam obtained by evaporating the fish mass as heating medium in said drying step.

10. A process according to claim 1, in whch the evaporation of the mixture of sludge and stick water in said zone is carried out under vacuum, thee entire process being carried out as a low temperature process in which the fish mass is brought to a temperature not exceeding about 60° C.

11. A process according to claim 1, in which said mixture in said evaporating zone is evaporated to a dry substance content of 50-80% by weight during a residence time in the range of 2-6 minutes and at least largely under atmospheric pressure.

* * * * *

UNITED STATES PATENT AND TRADEMARK OFFICE
CERTIFICATE OF CORRECTION

PATENT NO. : 4,344,976
DATED : August 17, 1982
INVENTOR(S) : Per Bladh

It is certified that error appears in the above-identified patent and that said Letters Patent are hereby corrected as shown below:

Col. 3, line 10, after "process" insert--can be carried out entirely as a low temperature process--.

Col. 4, line 27, after "evaporated" insert-- sludge-containing--.

Signed and Sealed this

Twenty-third Day of April 1985

[SEAL]

Attest:

DONALD J. QUIGG

Attesting Officer

Acting Commissioner of Patents and Trademarks